(12) United States Patent
Fasola et al.

(10) Patent No.: US 11,906,311 B2
(45) Date of Patent: *Feb. 20, 2024

(54) PAVEMENT MARKING MAP CHANGE DETECTION, REACTION, AND LIVE TILE SHIPPING

(71) Applicant: GM Cruise Holdings LLC, San Francisco, CA (US)

(72) Inventors: Juan Fasola, San Francisco, CA (US); Harman Kumar, San Francisco, CA (US); Shreyans Kushwaha, San Francisco, CA (US); Xiaoyu Zhou, San Francisco, CA (US); Yu-Cheng Lin, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,937

(22) Filed: Mar. 8, 2023

(65) Prior Publication Data
US 2023/0221127 A1 Jul. 13, 2023

Related U.S. Application Data

(63) Continuation of application No. 16/915,468, filed on Jun. 29, 2020, now Pat. No. 11,624,618.

(51) Int. Cl.
*G01C 21/32* (2006.01)
*G01S 17/89* (2020.01)
*G05D 1/02* (2020.01)
*G05D 1/00* (2006.01)

(52) U.S. Cl.
CPC .............. *G01C 21/32* (2013.01); *G01S 17/89* (2013.01); *G05D 1/0274* (2013.01); *G05D 1/0088* (2013.01); *G05D 2201/0213* (2013.01)

(58) Field of Classification Search
CPC ................................ G01C 21/32; G01S 17/89
See application file for complete search history.

(56) References Cited

U.S. PATENT DOCUMENTS

| | | |
|---|---|---|
| 6,856,897 B1 | 2/2005 | Phuyal et al. |
| 10,803,325 B2 | 10/2020 | Bai et al. |
| 2016/0217611 A1 | 7/2016 | Pylvaenaeinen et al. |
| 2021/0095970 A1 | 4/2021 | Lu et al. |
| 2021/0304491 A1 | 9/2021 | Caccin et al. |

*Primary Examiner* — Nicholas Kiswanto
*Assistant Examiner* — Christopher A Buksa
(74) *Attorney, Agent, or Firm* — Novak Druce Carroll LLP

(57) ABSTRACT

Systems, methods, and computer-readable media are provided for detecting a pavement marking around an autonomous vehicle, comparing the detected pavement marking with a pavement marking present in a semantic data map, determining whether a change has occurred between the detected pavement marking and the pavement marking present in the semantic data map, and updating the semantic data map based on the determining of whether the change has occurred between the detected pavement marking and the pavement marking present in the semantic data map.

20 Claims, 5 Drawing Sheets

:::: {.columns}
::: {.column}
PAVEMENT MARKING MAP CHANGE DETECTION, REACTION, AND LIVE TILE SHIPPING

CROSS-REFERENCE TO RELATED APPLICATIONS

This application is a continuation of and claims the benefit of U.S. application Ser. No. 16/915,468, filed on Jun. 29, 2020, entitled PAVEMENT MARKING MAP CHANGE DETECTION, REACTION, AND LIVE TILE SHIPPING, which is expressly incorporated by reference herein in its entirety.

BACKGROUND

1. Technical Field

The subject technology provides solutions for pavement markings, and in particular, for detecting pavement marking changes and updating semantic maps accordingly.

2. Introduction

Autonomous vehicles are vehicles having computers and control systems that perform driving and navigation tasks conventionally performed by a human driver. As autonomous vehicle technologies continue to advance, ride-hailing services will increasingly utilize autonomous vehicles to improve service safety and efficiency. For effective use in ride-hailing deployments, autonomous vehicles will be required to execute many service functions that are conventionally performed by human drivers.

Autonomous vehicles can further utilize semantic maps to navigate across a particular terrain, when deployed. When the autonomous vehicle travels into an area where the surroundings (e.g., pavement markings) do not match the prior semantic map, the autonomous vehicle may be unable to function properly and select an unsafe route to proceed.

As such, a need exists for a system and a method that can efficiently and effectively detect changes in pavement markings, thereby allowing for rapid and safe route determination.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

::: {.column}

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Figure 1:
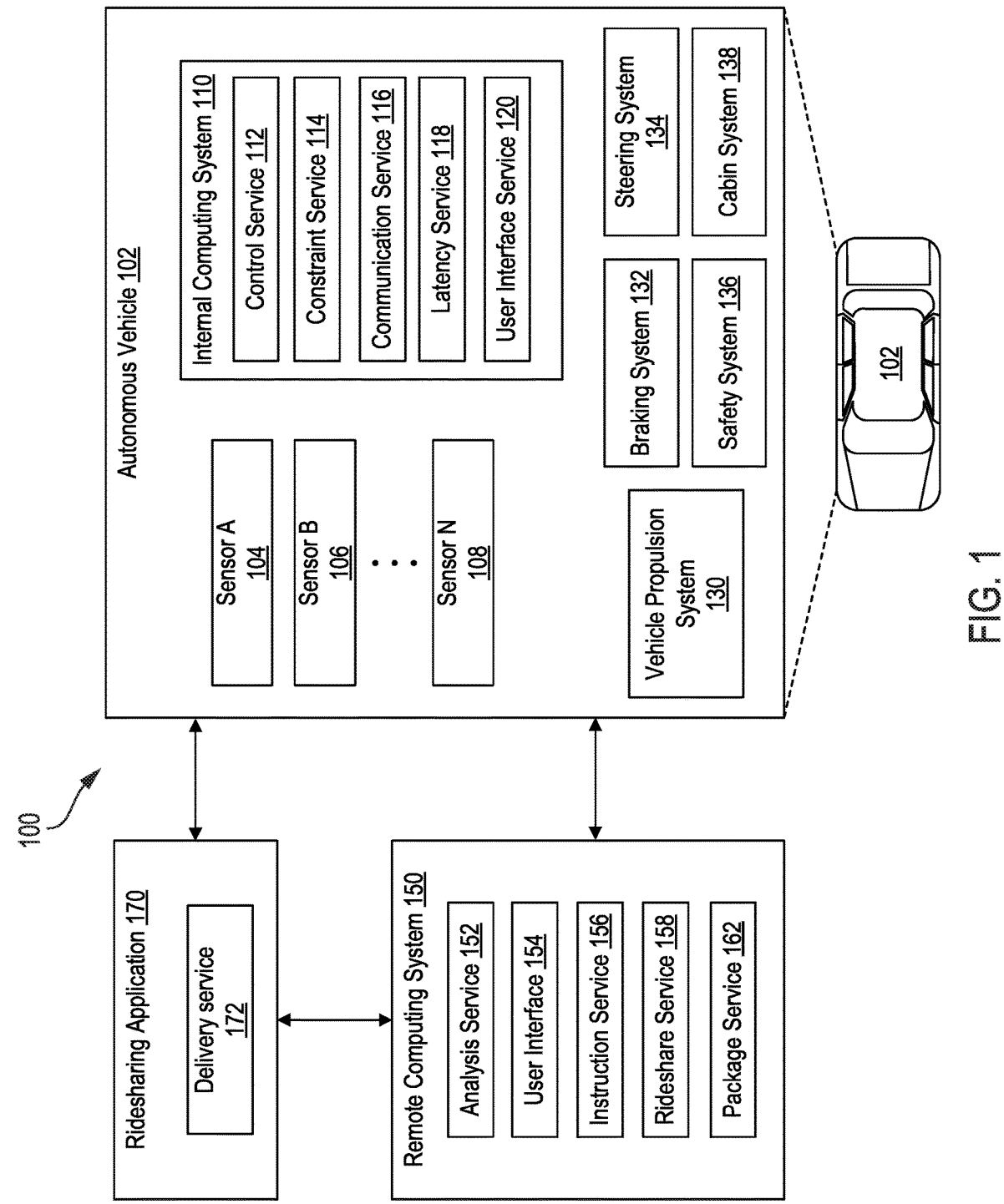
FIG. 1 illustrates an example environment that includes an autonomous vehicle in communication with a remote computing system, according to some aspects of the disclosed technology.

FIG. 1 illustrates an example autonomous vehicle environment 100. The example autonomous vehicle environment 100 includes an autonomous vehicle 102, a remote computing system 150, and a ridesharing application 170. The autonomous vehicle 102, remote computing system 150, and ridesharing application 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The sensors 104-108 on the autonomous vehicle 102 can include one or more types of sensors and can be arranged about the autonomous vehicle 102. For example, the sensors 104-108 can include, without limitation, one or more inertial measuring units (IMUs), one or more image sensors (e.g., visible light image sensors, infrared image sensors, video camera sensors, surround view camera sensors, etc.), one or more light emitting sensors, one or more global positioning system (GPS) devices, one or more radars, one or more light detection and ranging sensors (LIDARs), one or more sonars, one or more accelerometers, one or more gyroscopes, one or more magnetometers, one or more altimeters, one or more tilt sensors, one or more motion detection sensors, one or more light sensors, one or more audio sensors, etc. In some implementations, sensor 104 can be a radar, sensor 106 can be a first image sensor (e.g., a visible light camera), and sensor 108 can be a second image sensor (e.g., a thermal camera). Other implementations can include any other number and type of sensors.

The autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous
:::
::::

vehicle 102 can also include a cabin system 138, which can include cabin temperature control systems, in-cabin entertainment systems, etc.

The autonomous vehicle 102 can include an internal computing system 110 in communication with the sensors 104-108 and the systems 130, 132, 134, 136, and 138. The internal computing system 110 includes one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface that provides cellular (long-term evolution (LTE), 3rd Generation (3G), 5th Generation (5G), etc.) communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to the autonomous vehicle 102 regarding destinations, requested routes, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing devices, such as tablet computers, laptop computers, smartphones, head-mounted displays (HMDs), gaming systems, servers, smart devices, smart wearables, and/or any other computing devices. In some cases, such computing devices can be passenger computing devices. The rideshare service 158 can receive from passenger ridesharing app 170 requests, such as user requests to be picked up or dropped off, and can dispatch autonomous vehicle 102 for a requested trip.

The rideshare service 158 can also act as an intermediary between the ridesharing app 170 and the autonomous vehicle 102. For example, rideshare service 158 can receive from a passenger instructions for the autonomous vehicle 102, such as instructions to go around an obstacle, change routes, honk the horn, etc. The rideshare service 158 can provide such instructions to the autonomous vehicle 102 as requested.

The remote computing system 150 can also include a package service 162 configured to interact with the ridesharing application 170 and/or a delivery service 172 of the ridesharing application 170. A user operating ridesharing application 170 can interact with the delivery service 172 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 172 to provide a package identifier to the user for package labeling and tracking. Package delivery service 172 can also inform a user of where to bring their labeled package for drop off. In some examples, a user can request the autonomous vehicle 102 come to a specific location, such as the user's location, to pick up the package. While delivery service 172 has been shown as part of the ridesharing application 170, it will be appreciated by those of ordinary skill in the art that delivery service 172 can be its own separate application.

One beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Autonomous vehicles are vehicles having computers and control systems that perform driving and navigation tasks conventionally performed by a human driver. As autonomous vehicle technologies continue to advance, ride-hailing services will increasingly utilize autonomous vehicles to improve service safety and efficiency. For effective use in ride-hailing deployments, autonomous vehicles will be required to execute many service functions that are conventionally performed by human drivers.

Autonomous vehicles can further utilize semantic maps to navigate across a particular terrain, when deployed. When the autonomous vehicle travels into an area where the surroundings (e.g., pavement markings) do not match the prior semantic map, the autonomous vehicle may be unable to function properly and select an unsafe route to proceed.

As such, a need exists for a system and a method that can efficiently and effectively detect changes in pavement markings, thereby allowing for rapid and safe route determination.

Figure 2:
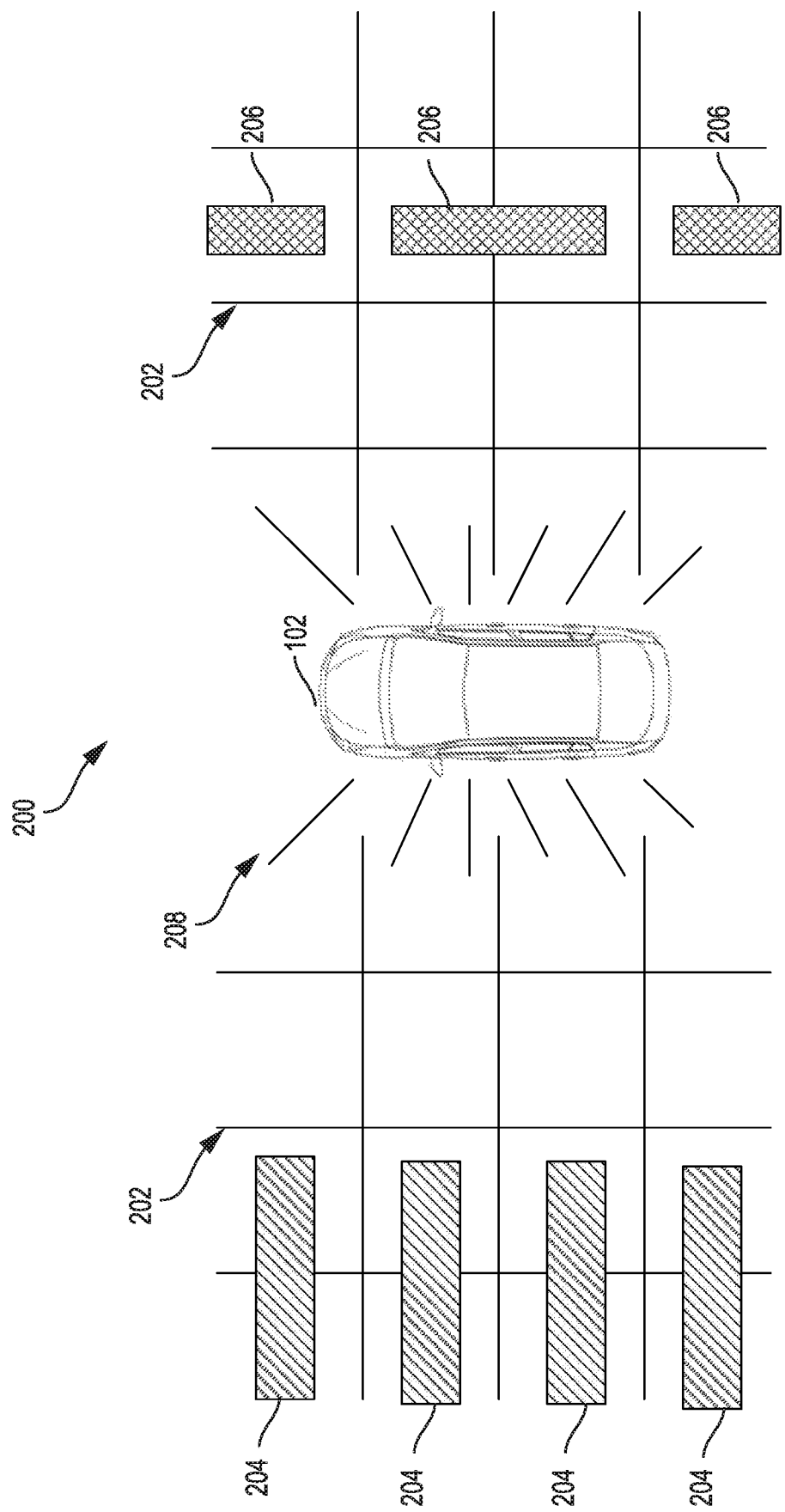
FIG. 2 illustrates an example pavement marking detection system, according to some aspects of the disclosed technology.

FIG. 2 illustrates an example pavement marking detection system 200, according to some aspects of the disclosed technology. In some instances, the pavement marking detection system 200 can provide an efficient closed loop pipeline for updating semantic map changes based on detected pavement marking changes.

An autonomous vehicle 102 is a motorized vehicle that can navigate without a human driver. Autonomous vehicle navigation can be dependent on the ability of the autonomous vehicle 102 to detect and make sense of its surrounding environment. In some implementations, these navigation functions n be performed by the autonomous vehicle 102 using labeled images of an environment through which the autonomous vehicle 102 is navigating. For example, properly labeled images indicating drivable surfaces (e.g., roadways, intersections, crosswalks, and on-ramps, etc.) can utilized by the autonomous vehicle 102 to make navigation and planning decisions.

In some instances, top-down (2D) images of roadways or other drivable surfaces can be labeled, wherein geometric boundaries (e.g., polygons) can be placed around items of interest (e.g., roadways, crosswalks, or intersections, etc.), and can also associates a semantic label with these geometric shapes. By way of example, in labeling an image of a four-way intersection, a labeler may draw bounding boxes around the four crosswalks and indicate a semantic label with each. In some instances, each bounding box may be tagged to correspond with the label "crosswalk," or another label that uniquely identifies that particular crosswalk and its associated bounding box.

The autonomous vehicle 102 can include various sensors 208, such as a camera sensor, a light detection and ranging (LIDAR) sensor, and a radio detection and ranging (RADAR) sensor, and any other sensor suitable for the intended purpose and understood by a person of ordinary skill in the art. The sensors 208 collect data and measurements that the autonomous vehicle 102 can use for operations such as navigation. The sensors 208 can provide the data and measurements to an internal computing system of the autonomous vehicle 102, which can use the data and measurements to control a mechanical system of the autonomous vehicle 102, such as a vehicle propulsion system, a braking system, or a steering system. Furthermore, the sensors 208 can be mounted at fixed locations on the autonomous vehicle 102.

In an autonomous vehicle environment, the environment itself continuously changes over time, which may dictate updates to internal/semantic maps of the autonomous vehicle environment. For example, traffic object position (e.g., traffic lights, traffic signals, or traffic signs), type, and pavement markings 204, 206 (e.g., lane association/lane lines 202 and crosswalks 204) can change abruptly due to construction, repaving, updates, and a car accidents. If traffic maps are not updated accordingly with information received from sensors 208 of the autonomous vehicles 102 in a fleet, there is the risk of an autonomous vehicle 102 entering an intersection when the autonomous vehicle 102 does not have the "right of way." For example, according to the autonomous vehicle's 102 current map, a stop sign should be at an intersection, when in actuality, the stop sign has been replaced with a traffic signal because of construction. In another example, the pavement marking 204, 206 may have shifted due to repositioning or repaving of the pavement. Without an updated traffic map, the autonomous vehicle 102 would enter the intersection or cross a lane line thinking that it had the right of way, when in actuality, the autonomous vehicle 102 was illegally entering the intersection or dangerously crossing the lane line.

In some instances, the pavement marking detection system 200 can include an online map change detector that is configured to identify pavement marking changes (e.g., lane paint changes). The pavement marking detection system 200 can include utilizing the sensors 208 to detect the pavement marking changes. In some instances, the pavement marking detection system 200 can provide the pavement marking changes to a backend server/network/system to analyze the detected pavement marking changes and to determine whether to update semantic maps accordingly. For example, if the detected pavement marking changes are minor, then the semantic maps are not updated and the autonomous vehicles 102 can proceed as normal. However, if the pavement marking changes are significant or reach a predetermined threshold, then the semantic maps can be updated accordingly and provided to the autonomous vehicle fleet for route determination. In other instances, when the autonomous vehicle 102 drives into a map changed area (e.g., lane boundaries shifted, new lane boundaries appear, etc.), the pavement marking detection system 200 of the autonomous vehicle 102 can determine which route to take or whether to change the current route based on the severity of pavement marking changes.

In other instances, the pavement marking detection system 200 can further include generating local LIDAR intensity tiles and colorized tiles (e.g., geospatial tiles 202) that can then be utilized by the autonomous vehicle 102 and/or provided to the backend system for further processing and/or updating of semantic maps. In some cases, the LIDAR intensity tiles can include a variation or a gradation of "intensity" to indicate a detected pavement marking based on a LIDAR point cloud data. In other cases, the colorized tiles can include various colors that indicate a detected pavement marking. For example, "red" can indicate a severe pavement marking change, while "yellow" can indicate a minor pavement marking change. Furthermore, the colorized tiles can appear to be colorized pictures of the road. In some instances, the colorized pictures can assist in providing more semantics such as green bike lanes, red bus lanes, or yellow lane markings, which may be easier to understand in color than as LIDAR intensity tiles.

In some instances, if the pavement marking change is outside of the autonomous vehicle's 102 traveling path, then the autonomous vehicle 102 does not have to respond to the pavement marking change by altering the autonomous vehicle's 102 current route selection. However, to prevent other autonomous vehicles 102 from driving into the same area with outdated semantic information, the backend system of the pavement marking detection system 200 can provide an updated local live accumulated LIDAR intensity map and a "top-down" colored map to the other autonomous vehicles 102 of the fleet.

In other instances, the pavement marking detection system 200 can place a temporary blacklist around the area having a detected pavement marking change; update the semantic information of the current semantic map with corrected map information; and provide the updated semantic map across the autonomous vehicle fleet 102 so that other autonomous vehicles 102 may have up-to-date traffic maps, thereby diminishing the amount of possible collisions, accidents, and delays experienced by the autonomous vehicle fleet 102.

In some cases, if the pavement marking change can affect the autonomous vehicle's 102 traveling path, then the pavement marking detection system 200 can initiate a request for remote assistance (e.g., an operator) to manually navigate the autonomous vehicle 102 through the map changed area along with providing sensor data to the backend system to further analyze the changed pavement marking data. In other cases, the pavement marking detection system 200 can provide the newly detected pavement marking data to planning stacks, which can directly consume the newly detected pavement marking data and navigate the autonomous vehicle 102 through the map changed area.

Figure 3:
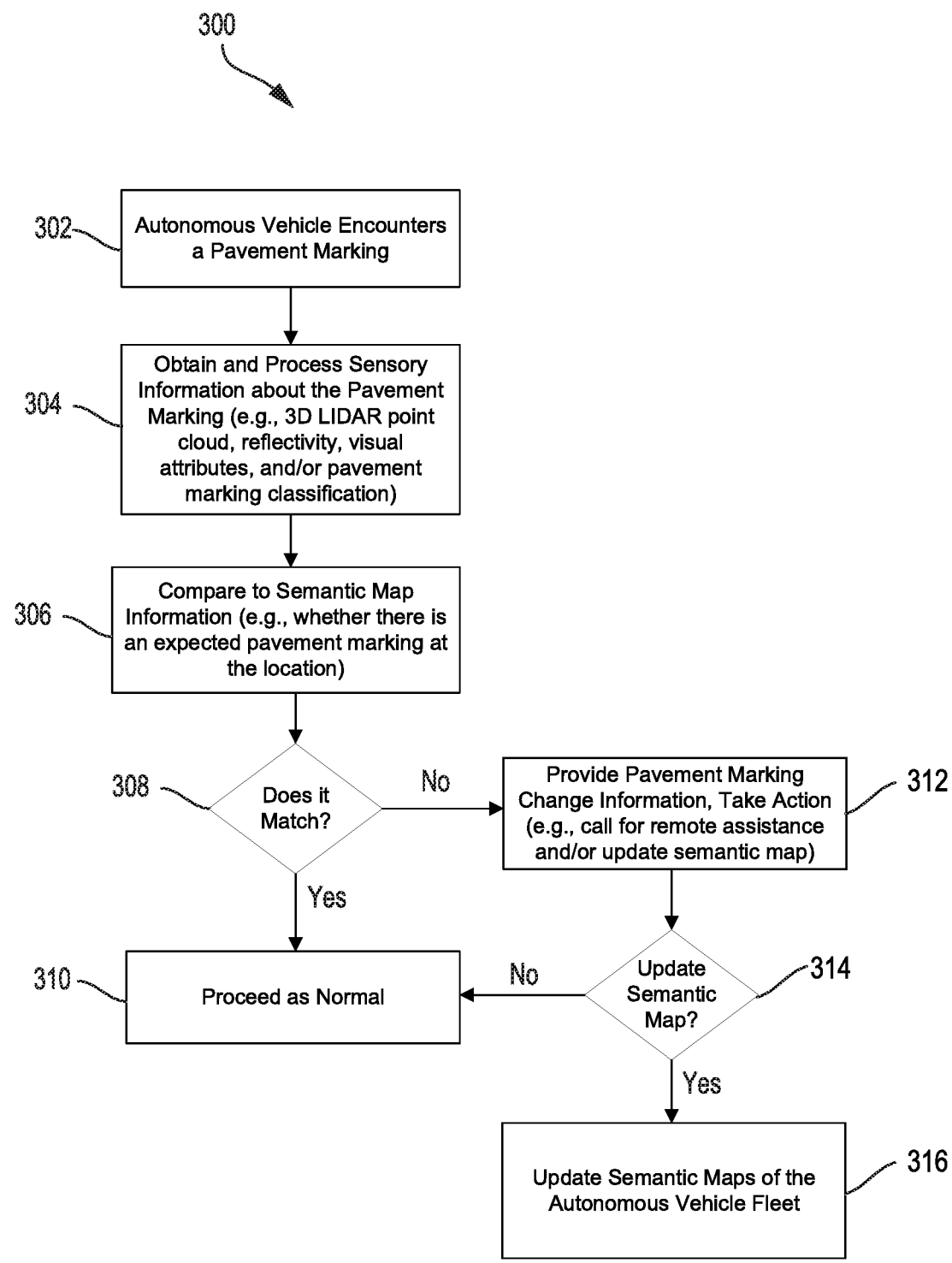
FIG. 3 illustrates an example flow chart of a pavement marking detection process, according to some aspects of the disclosed technology.

FIG. 3 illustrates an example flow chart of a pavement marking detection process 300, according to some aspects of the disclosed technology.

In some instances, the pavement marking detection process 300 can include an autonomous vehicle encountering and detecting a pavement marking 302 such as yield markings, work zone pavement markings, speed hump markings, bike-only lane markings, bike detector markings, crosswalk markings, parking space markings, curb markings, raised pavement markings, highway-rail grade crossing markings, intersection markings, two-way traffic markings, freeway entrance and exit markings, high occupancy vehicle lane markings, and any other pavement markings suitable for the intended purpose and understood by a person of ordinary skill in the art.

The pavement marking detection process 300 can further include obtaining and processing sensory information and data regarding the detected pavement marking 304. The sensory information can be obtained by utilizing sensors as described above such as a 3D LIDAR point cloud, reflectivity measurements, visual attributes from cameras, and/or pavement marking classifications.

In some instances, the pavement marking detection process 300 can compare the detected pavement markings with data from semantic map information available to the autonomous vehicle 306. For example, the comparison can determine whether there is an expected pavement marking at a particular location. If the detected pavement marking matches with the information from the semantic map available to the autonomous vehicle 308, the autonomous vehicle can proceed through the designated area as normal. If the detected pavement marking does not match with the information from the semantic map available to the autonomous vehicle 308, the autonomous vehicle can provide the detected pavement marking change data to a backend system and request remote assistance from an operator 312.

In other instances, the pavement marking detection process 300 can include determining whether to update the semantic map 314. For example, if the detected pavement marking changes are minor, then the semantic maps are not updated and the autonomous vehicles 102 can proceed as normal 310. However, if the pavement marking changes are significant or reach a predetermined threshold, then the semantic maps can be updated accordingly and provided to the autonomous vehicle fleet for route determination 316.

Figure 4:
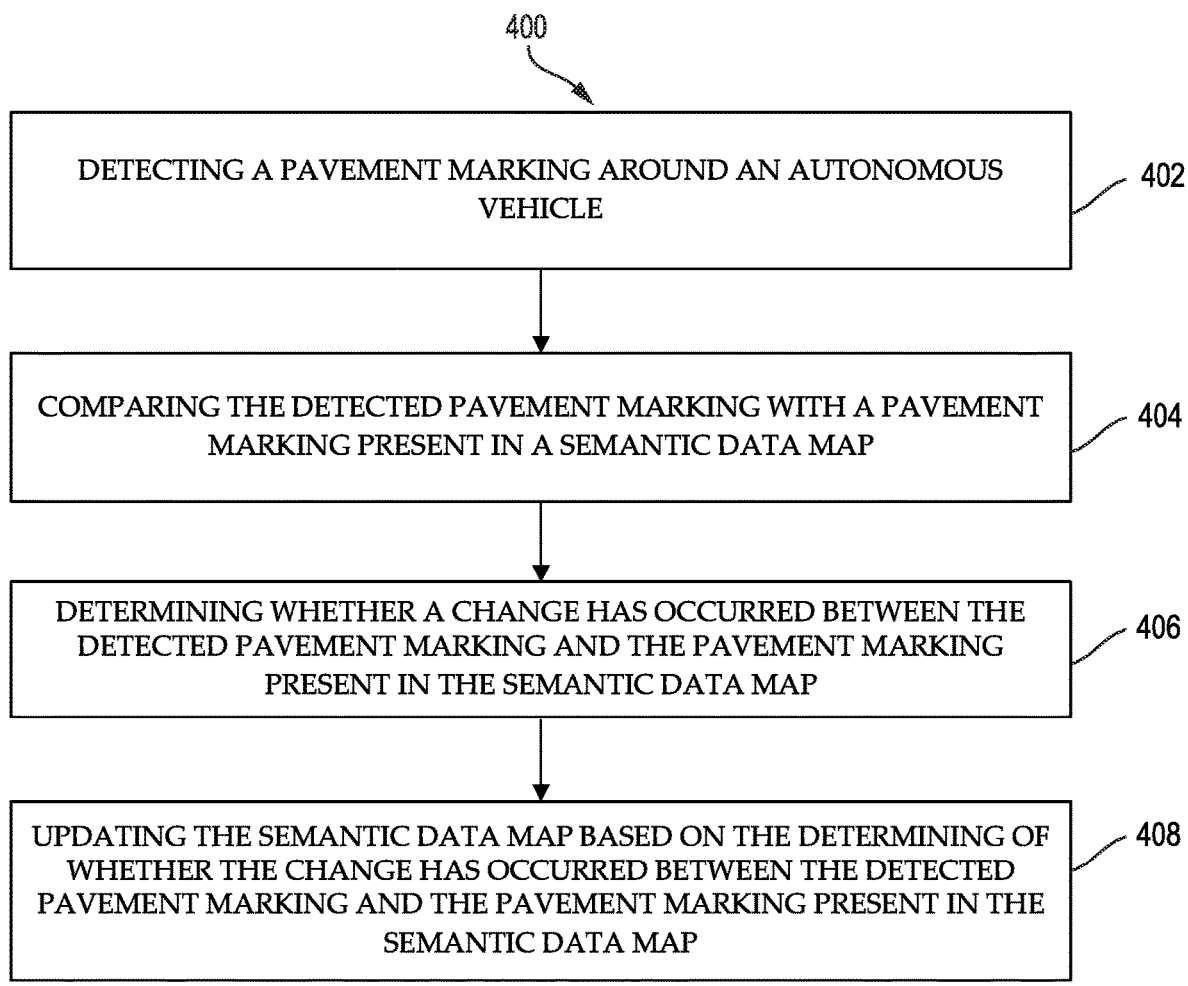
FIG. 4 illustrates an example process for updating semantic maps based on changes to pavement markings, according to some aspects of the disclosed technology.

Having disclosed some example system components and concepts, the disclosure now turns to FIG. 4, which illustrate example method 400 for updating semantic maps based on changes to pavement markings. The steps outlined herein are exemplary and can be implemented in any combination thereof, including combinations that exclude, add, or modify certain steps.

At step 402, the method 400 can include detecting a pavement marking around an autonomous vehicle. The pavement marking can be a lane line or a crosswalk. In some instances, the method 400 can include an autonomous vehicle encountering and detecting the pavement marking such as yield markings, work zone pavement markings, speed hump markings, bike-only lane markings, bike detector markings, crosswalk markings, parking space markings, curb markings, raised pavement markings, highway-rail grade crossing markings, intersection markings, two-way traffic markings, freeway entrance and exit markings, high occupancy vehicle lane markings, and any other pavement markings suitable for the intended purpose and understood by a person of ordinary skill in the art.

The detecting of the pavement marking can include detecting the pavement marking with 3D light detection and ranging (LIDAR) sensor. In some instances, the 3D LIDAR sensor can including providing a point cloud of the detected pavement marking. The autonomous vehicle can include various sensors, such as a camera sensor, a light detection and ranging (LIDAR) sensor, and a radio detection and ranging (RADAR) sensor, and any other sensor suitable for the intended purpose and understood by a person of ordinary skill in the art.

In some instances, the method 400 can further include obtaining and processing sensory information and data regarding the detected pavement marking. The sensory information can be obtained by utilizing sensor information such as a 3D LIDAR point cloud, reflectivity measurements, visual attributes from cameras, and/or pavement marking classifications.

At step 404, the method 400 can include comparing the detected pavement marking with a pavement marking present in a semantic data map. In some instances, the method 400 can include comparing the detected pavement markings with data from semantic map information available to the autonomous vehicle. For example, the comparison can determine whether there is an expected pavement marking at a particular location. If the detected pavement marking matches with the information from the semantic map available to the autonomous vehicle, the autonomous vehicle can proceed through the designated area as normal. If the detected pavement marking does not match with the information from the semantic map available to the autonomous vehicle, the autonomous vehicle can provide the detected pavement marking change data to a backend system and request remote assistance from an operator.

At step 406, the method 400 can include determining whether a change has occurred between the detected pavement marking and the pavement marking present in the semantic data map. The change that has occurred between the detected pavement marking and the pavement marking present in the semantic data map can be a percentage of change or a threshold that is exceeded between the detected pavement marking and the pavement marking present in the semantic data map.

In some instances, the method 400 can include providing an online map change detector that is configured to identify pavement marking changes (e.g., lane paint changes). In some instances, the method 400 can include providing the pavement marking changes to a backend server/network/system to analyze the detected pavement marking changes and to determine whether to update semantic maps accordingly.

At step 408, the method 400 can include updating the semantic data map based on the determining of whether the change has occurred between the detected pavement marking and the pavement marking present in the semantic data map. For example, if the detected pavement marking changes are minor, then the semantic maps are not updated by the method 400 and the autonomous vehicles can proceed as normal. However, if the pavement marking changes are significant or reach a predetermined threshold, then the semantic maps can be updated accordingly by the method 400 and provided to the autonomous vehicle fleet for route determination. In other instances, when the autonomous vehicle drives into a map changed area (e.g., lane boundaries shifted, new lane boundaries appear, etc.), the method 400 can include determining which route to take or whether to change the current route based on the severity of pavement marking changes.

In some instances, the method 400 can further include providing the updated semantic data map to an autonomous vehicle fleet. In some instances, if the pavement marking change is outside of the autonomous vehicle's traveling path, then the autonomous vehicle does not have to respond to the pavement marking change by altering the autonomous vehicle's current traveling path. However, to prevent other autonomous vehicles from driving into the same area with outdated semantic information, the method 400 can include providing an updated local live accumulated LIDAR intensity map and a "top-down" colored map to the other autonomous vehicles of the fleet.

In other instances, the method 400 can include placing a temporary blacklist around the area having a detected pavement marking change; updating the semantic information of the current semantic map with corrected map information; and providing the updated semantic map across the autonomous vehicle fleet so that other autonomous vehicles may have up-to-date traffic maps, thereby diminishing the amount of possible collisions, accidents, and delays experienced by the autonomous vehicle fleet.

In some cases, if the pavement marking change can affect the autonomous vehicle's traveling path, then the method 400 can include initiating a request for remote assistance (e.g., an operator) to manually navigate the autonomous vehicle through the map changed area along with providing sensor data to a backend system to further analyze the changed pavement marking data. In other cases, the method 400 can include providing the newly detected pavement marking data to planning stacks, which can directly consume the newly detected pavement marking data and navigate the autonomous vehicle through the map changed area.

In other instances, the method 400 can further include generating geospatial tiles around the autonomous vehicle, and designating each geospatial tile that is associated with the detected pavement marking. The geospatial tile can be a local LIDAR intensity tile or a colorized tile. In some instances, the method 400 can further include generating local LIDAR intensity tiles and colorized tiles (e.g., geospatial tiles 202) that can then be utilized by the autonomous vehicle and/or provided to the backend system for further processing and/or updating of semantic maps. In some cases, the LIDAR intensity tiles can include a variation or a gradation of "intensity" to indicate a detected pavement marking based on a LIDAR point cloud data. In other cases, the colorized tiles can include various colors that indicate a detected pavement marking. For example, "red" can indicate a severe pavement marking change, while "yellow" can indicate a minor pavement marking change.

Figure 5:
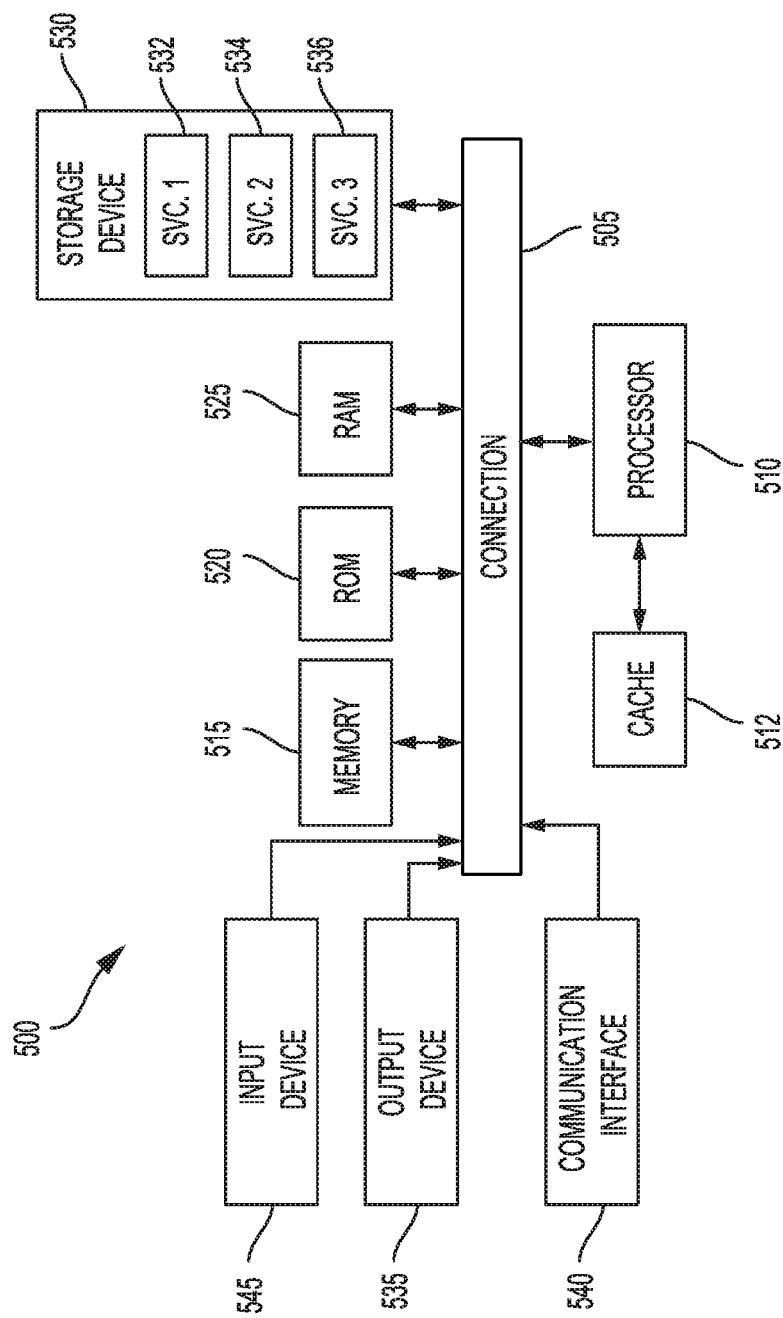
FIG. 5 illustrates an example processor-based system with which some aspects of the subject technology can be implemented.

FIG. 5 illustrates an example computing system 500 which can be, for example, any computing device making up internal computing system 110, remote computing system 150, a passenger device executing rideshare application 170, or any other computing device. In FIG. 5, the components of the computing system 500 are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method comprising:
   determining, by an autonomous vehicle, that light detection and ranging (LiDAR) sensor data captured using at least one LiDAR sensor associated with the autonomous vehicle includes a detected pavement marking;
   comparing, by the autonomous vehicle, the LiDAR sensor data that includes the detected pavement marking with corresponding data map points of a pavement marking present in a semantic data map;
   determining, by the autonomous vehicle and based on the comparing, that a change has occurred between the detected pavement marking and the pavement marking present in the semantic data map;
   determining, by the autonomous vehicle, a severity of the change of the detected pavement marking;
   in response to determining that the severity of the change of the detected pavement marking is greater than an acceptable threshold, updating, by the autonomous vehicle, the semantic data map based on the change to produce an updated semantic data map, wherein the semantic data map is updated by selecting between generating local LiDAR intensity tiles or generating colorized tiles for geospatial tiles based on a category of the detected pavement marking; and
navigating the autonomous vehicle based on the updated semantic data map.

2. The computer-implemented method of claim 1, wherein the detected pavement marking is a lane line or a crosswalk.

3. The computer-implemented method of claim 1, wherein the change that has occurred between the detected pavement marking and the pavement marking present in the semantic data map is a percentage of change between the detected pavement marking and the pavement marking present in the semantic data map.

4. The computer-implemented method of claim 1, further comprising providing the updated semantic data map to an autonomous vehicle fleet server.

5. The computer-implemented method of claim 1, further comprising:
generating geospatial tiles around the autonomous vehicle; and
designating each geospatial tile that is associated with the detected pavement marking.

6. The computer-implemented method of claim 5, wherein the geospatial tile is a local LIDAR intensity tile or a colorized tile.

7. The computer-implemented method of claim 1, further comprising:
in response to determining that the severity of the change of the detected pavement marking is greater than the acceptable threshold, determining an updated route for the autonomous vehicle.

8. The computer-implemented method of claim 1, further comprising:
determining that the change of the detected pavement marking is outside of a current route of the autonomous vehicle; and
in response, proceeding along the current route of the autonomous vehicle.

9. An autonomous vehicle comprising:
one or more processors; and
at least one computer-readable storage medium having stored therein instructions which, when executed by the one or more processors, cause the autonomous vehicle to:
determine that light detection and ranging (LiDAR) sensor data captured using at least one LiDAR sensor associated with the autonomous vehicle includes a detected pavement marking;
compare the LiDAR sensor data that includes the detected pavement marking with corresponding data map points of a pavement marking present in a semantic data map;
determine, based on the comparing, that a change has occurred between the detected pavement marking and the pavement marking present in the semantic data map;
determine a severity of the change of the detected pavement marking;
in response to determining that the severity of the change of the detected pavement marking is greater than an acceptable threshold, update the semantic data map based on the change to produce an updated semantic data map, wherein the semantic data map is updated by selecting between generating local LiDAR intensity tiles or generating colorized tiles for geospatial tiles based on a category of the detected pavement marking; and
navigate the autonomous vehicle based on the updated semantic data map.

10. The autonomous vehicle of claim 9, wherein the detected pavement marking is a lane line or a crosswalk.

11. The autonomous vehicle of claim 9, wherein the change that has occurred between the detected pavement marking and the pavement marking present in the semantic data map is a percentage of change between the detected pavement marking and the pavement marking present in the semantic data map.

12. The autonomous vehicle of claim 9, wherein the instructions which, when executed by the one or more processors, cause the autonomous vehicle to provide the updated semantic data map to an autonomous vehicle fleet server.

13. The autonomous vehicle of claim 9, wherein the instructions which, when executed by the one or more processors, cause the autonomous vehicle to:
generate geospatial tiles around the autonomous vehicle; and
designate each geospatial tile that is associated with the detected pavement marking.

14. The autonomous vehicle of claim 13, wherein the geospatial tile is a local LIDAR intensity tile or a colorized tile.

15. The autonomous vehicle of claim 9, wherein the instructions which, when executed by the one or more processors, cause the autonomous vehicle to:
determine that the change of the detected pavement marking is outside of a current route of the autonomous vehicle; and
in response, proceed along the current route of the autonomous vehicle.

16. A non-transitory computer-readable storage medium comprising:
instructions stored on the non-transitory computer-readable storage medium, the instructions, when executed by one or more processors, cause the one or more processors to:
determine that light detection and ranging (LiDAR) sensor data captured using at least one LiDAR sensor associated with an autonomous vehicle includes a detected pavement marking;
compare the LiDAR sensor data that includes the detected pavement marking with corresponding data map points of a pavement marking present in a semantic data map;
determine, based on the comparing, that a change has occurred between the detected pavement marking and the pavement marking present in the semantic data map;
determine a severity of the change of the detected pavement marking;
in response to determining that the severity of the change of the detected pavement marking is greater than an acceptable threshold, update, the semantic data map based on the change to produce an updated semantic data map, wherein the semantic data map is updated by selecting between generating local LiDAR intensity tiles or generating colorized tiles for geospatial tiles based on a category of the detected pavement marking; and
navigate the autonomous vehicle based on the updated semantic data map.

17. The non-transitory computer-readable storage medium of claim 16, wherein the detected pavement marking is a lane line or a crosswalk.

18. The non-transitory computer-readable storage medium of claim 16, wherein the change that has occurred between the detected pavement marking and the pavement marking present in the semantic data map is a percentage of change between the detected pavement marking and the pavement marking present in the semantic data map.

19. The non-transitory computer-readable storage medium of claim 16, wherein the instructions, when executed by the one or more processors, cause the one or more processors to provide the updated semantic data map to an autonomous vehicle fleet server.

20. The non-transitory computer-readable storage medium of claim 16, wherein the instructions, when executed by the one or more processors, cause the one or more processors to:
generate geospatial tiles around the autonomous vehicle; and
designate each geospatial tile that is associated with the detected pavement marking, wherein the geospatial tile is a local LIDAR intensity tile or a colorized tile.

\* \* \* \* \*